United States Patent
Ehlgen et al.

(10) Patent No.: US 9,114,754 B2
(45) Date of Patent: Aug. 25, 2015

(54) METHOD FOR REGULATING THE BEAM RANGE OF AT LEAST ONE HEADLAMP OF A VEHICLE AND LIGHT CONTROL DEVICE

(75) Inventors: Tobias Ehlgen, Ravensburg (DE);
Stefan Nordbruch, Kornwestheim (DE);
Johannes Foltin, Ditzingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 26 days.

(21) Appl. No.: 14/114,083

(22) PCT Filed: Apr. 23, 2012

(86) PCT No.: PCT/EP2012/057340
§ 371 (c)(1),
(2), (4) Date: Jan. 8, 2014

(87) PCT Pub. No.: WO2012/146553
PCT Pub. Date: Nov. 1, 2012

(65) Prior Publication Data
US 2014/0129081 A1    May 8, 2014

(30) Foreign Application Priority Data

Apr. 28, 2011    (DE) .................. 10 2011 017 697

(51) Int. Cl.
*B60Q 1/115*    (2006.01)
*B60Q 1/00*    (2006.01)
*B60Q 1/10*    (2006.01)
*G01M 11/06*    (2006.01)

(52) U.S. Cl.
CPC .............. *B60Q 1/115* (2013.01); *B60Q 1/0023* (2013.01); *B60Q 1/10* (2013.01); *G01M 11/064* (2013.01); *G01M 11/068* (2013.01); *B60Q 2200/38* (2013.01); *B60Q 2300/324* (2013.01)

(58) Field of Classification Search
CPC .......... B60Q 1/0023; B60Q 2300/324; B60Q 1/115; B60Q 2200/38; G01M 11/064; G01M 11/068

USPC ............................................... 701/36
See application file for complete search history.

(56) References Cited

U.S. PATENT DOCUMENTS 5,193,894 A * 3/1993 Lietar et al. .................. 362/466
6,144,159 A * 11/2000 Lopez et al. .................. 315/82
(Continued)

FOREIGN PATENT DOCUMENTS

DE             43 41 409        6/1995
DE        10 2007 010 273       9/2008
(Continued)

OTHER PUBLICATIONS

JPO machine translation of JP 2009-29227 (original JP document published Feb. 12, 2009).*
(Continued)

*Primary Examiner* — Behrang Badii
*Assistant Examiner* — David Testardi
(74) *Attorney, Agent, or Firm* — Kenyon & Kenyon LLP

(57) ABSTRACT

A method for beam range regulation of at least one headlamp of a vehicle includes: reading in a camera image of at least one camera of the vehicle, the camera image including at least a part of a representation of a projection surface of a light cone of the headlamp in front of the vehicle; determining at least one coordinate of at least one predefined brightness transition and/or of a predefined brightness inhomogeneity in the camera image; comparing the coordinate with a target coordinate in order to obtain a difference of the coordinate from the target coordinate, the target coordinate representing a coordinate at which the predefined brightness transition or the predefined brightness inhomogeneity is expected; and controlling the headlamp with a beam range modification signal that is a function of the difference, in order to modify the beam range.

9 Claims, 4 Drawing Sheets

(56) References Cited

U.S. PATENT DOCUMENTS

| | | | |
|---|---|---|---|
| 6,373,378 B1 * | 4/2002 | Ewerhart et al. | 340/425.5 |
| 6,765,353 B2 * | 7/2004 | Leleve | 315/77 |
| 6,960,005 B2 * | 11/2005 | Daicho et al. | 362/466 |
| 6,990,397 B2 * | 1/2006 | Albou et al. | 701/49 |
| 7,124,008 B2 * | 10/2006 | Brun et al. | 701/49 |
| 7,561,064 B2 * | 7/2009 | Yamamoto | 340/902 |
| 8,310,662 B2 * | 11/2012 | Mehr et al. | 356/121 |
| 8,600,111 B2 * | 12/2013 | Su et al. | 382/104 |
| 2011/0069303 A1 * | 3/2011 | Mehr et al. | 356/121 |

FOREIGN PATENT DOCUMENTS

| | | |
|---|---|---|
| DE | 10 2008 011 699 | 9/2008 |
| DE | 10 2008 031159 | 1/2010 |
| DE | 10 2010 029 149 | 11/2011 |
| EP | 0 867 336 | 9/1998 |
| EP | 0 949 118 | 10/1999 |
| EP | 1 964 717 | 9/2008 |
| EP | 2 128 590 | 12/2009 |
| JP | 2009029227 A * | 2/2009 |

OTHER PUBLICATIONS

EPO machine translation of EP 949118 (original EP document published Oct. 13, 1999).*

Priority document DE 102011017697.7 (published Oct. 31, 2012).*

International Search Report for PCT/EP2012/057340, dated Jun. 25, 2012.

* cited by examiner

METHOD FOR REGULATING THE BEAM RANGE OF AT LEAST ONE HEADLAMP OF A VEHICLE AND LIGHT CONTROL DEVICE

BACKGROUND OF THE INVENTION

1. Field of the Invention

The present invention relates to a method for regulating the beam range of at least one headlamp of a vehicle, to a light control device for regulating the beam range of at least one headlamp, and to a corresponding computer program product.

2. Description of the Related Art

In order to set a pitch angle of a headlamp on a vehicle, it is necessary to know a current beam range of the headlamp, in order to orient the headlamp in a manner corresponding to legal requirements, and thus to avoid blinding other traffic participants.

Published German patent application document DE 10 2010 029 149 describes a plausibilization of a beam range test value of a light cone, based on a reflection intensity of a point of a reflecting roadway marking and a currently produced reflection intensity model for the roadway marking.

BRIEF SUMMARY OF THE INVENTION

Against this background, the present invention presents a method for beam range regulation of at least one headlamp of a vehicle, and in addition presents a light control device for beam range regulation of at least one headlamp of a vehicle, as well as, finally, a corresponding computer program product.

The present invention is based on the recognition that in many vehicles there is installed an optical environment acquisition system, such as a camera, a stereo or top-view camera (multi-camera system), in order to provide assistance systems and safety systems of a vehicle with information concerning the environment around the vehicle. By using the camera information for beam range regulation, sensors provided exclusively for beam range regulation can be omitted. This results in significant cost savings and conservation of valuable resources such as copper, because fewer electric conductors are used. In addition, the availability of the beam range regulation is improved, because the camera can be situated in a windshield wiper wiping area, so that low-error environment recognition is always possible. In addition, aging of the lighting elements in the headlamps can be recognized through weaker illumination of a projection surface in front of the vehicle.

The present invention creates a method for beam range regulation of at least one headlamp of a vehicle, having the following steps:
reading in of a camera image of at least one camera of the vehicle, the camera image including at least a part of a representation of a projection surface of a light cone of the headlamp in front of the vehicle;
determination of at least one coordinate of at least one predefined brightness transition and/or of a predefined brightness inhomogeneity in the camera image;
comparison of the coordinate with a target coordinate in order to obtain a difference of the coordinate from the target coordinate, the target coordinate representing a coordinate at which the predefined brightness transition or the predefined brightness inhomogeneity is expected; and
controlling of the headlamp with a beam range modification signal that is a function of the difference, in order to modify the beam range.

In addition, the present invention creates a light control device for beam range regulation of at least one headlamp of a vehicle, having the following features:
a device for reading in a camera image of at least one camera of the vehicle, the camera image including at least a part of a representation of a projection surface of a light cone of the headlamp in front of the vehicle;
a device for determining at least one coordinate of at least one predefined brightness transition and/or of a predefined brightness inhomogeneity in the camera image;
a device for controlling a headlamp with a beam range modification signal that is a function of the difference, in order to modify the beam range.

A headlamp can be understood in particular as a front headlamp of a vehicle. A beam range regulation can be an adaptation of a beam range of a headlamp to prevailing surrounding conditions. Surrounding conditions can be for example a state of loading of the vehicle, a pitching movement of the vehicle due to acting forces, or a distance of another vehicle from the vehicle. For example, a beam range regulation can be accomplished through a modification of an angle of inclination, or pitch angle, or yaw angle of the headlamp, or through a modification of a radiation characteristic. For this purpose, the headlamp can have at least one actuator that moves at least one shaping element in order to form a light cone of the headlamp, in order to change the angle of inclination or the pitch angle of the headlamp in the vehicle. A camera image can represent visual information from a region of acquisition of a camera. The information can for example be mapped in a matrix of image points. An image point can have at least one brightness value. The camera or the camera system can be situated fixedly on the vehicle, and the region of acquisition can include at least a part of a field of view of a driver of the vehicle. A projection surface can be a surface illuminated by light from the headlamp. A light cone can be an expanding beam of light of the headlamp going out from a light source of the headlamp. Concentrating and scattering elements of the headlamp can cause the light from the headlamp to have a predefined brightness distribution, characteristic of a light cone, within the projection surface. A predefined brightness distribution can be understood as a shape or outline or an illumination intensity curve of the projection surface that is known ahead of time. In this way, brighter and darker regions can be projected within the projection surface. Predefined brightness transitions characteristic of a light cone can be situated between these regions or can occur in these regions. A predefined brightness transition can be understood as a difference in brightness between adjacent image points of the camera image that is greater than a predefined threshold. A coordinate can for example be understood as a line number and a column number of an image point of the point pattern of the camera image. A target coordinate can be a previously determined coordinate, allocated to the coordinate, at which the brightness transition is intended to occur in accordance with expectations. A difference or deviation can for example be a number of lines and/or columns between the coordinate and the target coordinate. The difference or deviation can be a vector. A beam range modification signal can be suitable for example to cause the actuator in the headlamp to execute a movement in order to modify the beam range of the headlamp. Here, for example a positive or negative direction of the difference can influence a positive or negative beam range modification signal corresponding to the positive or negative direction of the difference.

In the present context, a light control device can be understood as an electric apparatus that processes sensor signals and outputs control signals as a function thereof. The light control device can have an interface that can be realized as hardware and/or as software. In the case of a hardware realization, the interfaces can for example be part of a so-called system ASIC that contains a wide range of functions of the light control device. However, it is also possible for the interfaces to be separate integrated circuits, or to be made up at least partly of discrete components. In the case of a realization as software, the interfaces can be software modules present for example on a microcontroller alongside other software modules.

According to a further specific embodiment of the present invention, before the step of reading in a step is executed of initialization of the headlamp, in which the headlamp is controlled with an initialization signal in order to modify the projection surface, in particular to make it smaller. Through such an initialization of the headlamp, a predefined brightness transition characteristic of a light cone, and/or a predefined brightness distribution or brightness inhomogeneity characteristic of a light cone, can be determined in a particularly simple manner, because the projection surface of the headlamp cone is small during the initialization, and brighter and darker regions in the projection surface can be better recognized. An initialization signal can cause the headlamp to pivot in the direction of a roadway in front of the vehicle in order to cause a beam of the headlamp to meet the roadway at a steeper angle. An initialization coordinate can be predetermined, and can represent an expected location of a predefined brightness transition in the small projection surface.

In the step of determination, in addition at least a part of an outline of the projection surface can be determined, and in the step of comparison the outline can in addition be compared to a target outline in order to obtain the difference. An outline can be understood as a light-dark boundary of the projection surface. The outline can have a shape characteristic for the headlamp. Because the outline of the projection surface is particularly easily recognizable, the outline can advantageously be compared to a previously determined target outline in order to enable a rapid determination. In this way, the beam range can be adapted rapidly.

Corresponding to a further specific embodiment of the present invention, the method additionally includes a step of determining a reflectivity of a roadway in front of the vehicle from the image information, the coordinate being determined in the determination step using the reflectivity. A reflectivity can be understood as a capacity of the roadway to reflect a light signal. In particular, the reflectivity can represent a relation of reflected light to incident light. The reflectivity can influence a perceptibility of the brightness distribution. By including the reflectivity for the determination of the coordinate, the coordinate can be recognized better and more reliably.

Corresponding to a further specific embodiment of the present invention, in the step of determination a height contour of a roadway can be determined by traveling the roadway with the vehicle, and in the step of comparison the deviation can be determined taking into account the height contour. A height contour of a roadway can be understood as a contour or geodetic height of the roadway along a portion of the roadway. The height contour can also be obtained through an evaluation of camera-independent sensors that are also standardly present in the vehicle. For this purpose, the vehicle can record the height contour of the roadway over a specified stretch, and can combine it with a camera image recorded and stored at a beginning of the specified stretch. Through the evaluation of the recorded image with knowledge of the actual height contour of the roadway, information can be obtained concerning the projection surface on the specified stretch in order to regulate a beam range of the headlamp.

A surface estimation by the camera becomes more and more imprecise the further removed estimated measurement points on the surface are. Through a limited forecasting of the surface estimation of the camera, it is advantageous if a plurality of measurement values are measured and combined/offset with one another at different points in the camera image during travel along a stretch. In this way, using the forecasting sensor it is also possible to carry out a precise surveying of the surface.

By evaluating a pitch angle, which can also be estimated from the camera image, it is possible to infer the height contour while traveling a stretch.

The more cameras that are used for surface calculation, the more precise the result. In the case of a stereo camera system, the distance from an arbitrary point, and thus the surface, can be calculated directly from the two images (three-dimensional measurement, as in human vision).

Also, for example a rear-facing camera of a parking assistance system can provide an additional check of the measurement result of a forward-facing camera during travel along a stretch.

In addition, according to a further specific embodiment, in the step of determination an unevenness contour in front of the vehicle can be estimated in response to a recognition of an unevenness of the ground in front of the vehicle, and in the step of comparison the target coordinate can be adapted correspondingly to the unevenness contour. An unevenness of the ground can be a raised part such as a crest or a lowered part such as a dip. The recognition of the ground unevenness can take place using the at least one camera, but also via other sensors such as a navigation device having map material. From this, an unevenness contour can be determined that influences an expected light distribution and the expected projection surface of the light beam. Corresponding to the expected projection surface, the target coordinate may be expected at a different location. Through an estimation of the unevenness contour, a beam range regulation can be carried out with a camera even if the projection surface in front of the vehicle is not parallel to a contact surface of the wheels of the vehicle.

Corresponding to a further specific embodiment of the present invention, in the step of comparison the target coordinate can be read out from a memory device, the target coordinate having been determined in a preceding step of calibration and stored in the memory. A calibration can for example be a beam range regulation under controlled environmental conditions, such as on a test track or in a laboratory. In this way, for example for a particular headlamp type a calibration run can be carried out, and the obtained target coordinates can advantageously be used in many other headlamps of the same type for beam range regulation. The light distribution can also be estimated via a simulation on the computer, and can for example initially be transmitted to the camera for the comparison.

In addition, the method can include a step of modification of the target coordinate, the target coordinate being adapted to a variable parameter using a learning algorithm. When there is an exchange of a headlamp lighting element, e.g. after a light bulb has failed due to a defect, the initially calibrated light distribution changes. A change in brightness is predominantly to be expected as the parameter that can result in a slightly modified overall light distribution when there is an exchange of the lighting element of only one headlamp. A slight modification of the light image as parameter due to a small change in position of the light source when there is an exchange is also not to be ruled out. Likewise, when both light sources are exchanged, a modification in the overall brightness as parameter is to be expected.

The use of a learning method that adapts the stored target values over time can advantageously be used, for example when lighting elements/light sources are exchanged.

The light distribution can also be determined through simulations transmitted during production to the beam range regulation described here during installation/setting of parameters. A calibration run in a laboratory/test track is then no longer required. The simulation and reality differ from one another slightly in most cases. The use of a learning method that optimally adapts the simulation data over time is then advantageous.

Also advantageous is a computer program product having program code that can be stored on a machine-readable carrier such as a semiconductor memory device, a hard drive memory, or an optical memory, and is used to carry out the method according to one of the specific embodiments described above when the program is executed on a signal processing system or on a computer.

DETAILED DESCRIPTION OF THE INVENTION

Figure 1:
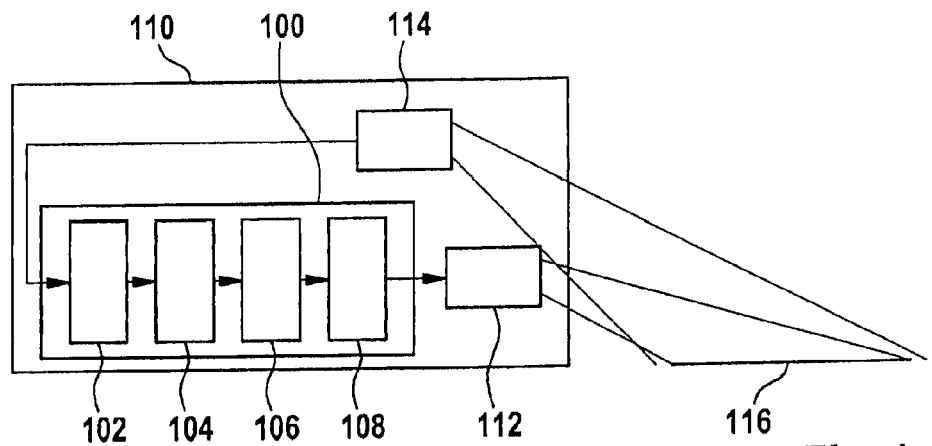
FIG. 1 shows a schematic representation of a vehicle having a light control device according to an exemplary embodiment of the present invention.

In the following description of preferred exemplary embodiments of the present invention, identical or similar reference characters are used for the elements shown in the various Figures and having similar function, and repeated description of these elements is omitted.

FIG. 1 shows a representation of a light control device 100 according to an exemplary embodiment of the present invention, having a device for reading in 102, a determination device 104, a device for comparison 106, and a device for controlling 108. Light control device 100 is installed in a vehicle 110 that has at least one headlamp 112 as well as at least one camera 114. Headlamp 112 is fashioned to project a light cone onto a projection surface 116 in front of vehicle 110. Camera 114 has an acquisition region that includes at least projection surface 116. Camera 114 is fashioned to provide a camera image that represents the region of acquisition of the camera in image points. Device for reading in 102 is fashioned to read in the camera image from camera 114. The camera image includes at least a part of a map of projection surface 116 of the light cone of headlamp 112 in front of vehicle 110. Device for determining 104 is fashioned to determine at least one coordinate of at least one predefined brightness transition, and, alternatively or in addition, of a predefined brightness distribution in the camera image. Device for comparison 106 is fashioned to compare the coordinate with a target coordinate in order to obtain a difference or deviation of the coordinate from the target coordinate. Device for controlling 108 is fashioned to control headlamp 112 with a beam range modification signal that is a function of the difference, in order to modify the beam range, in particular until the deviation is smaller than a tolerance value.

Figure 2:
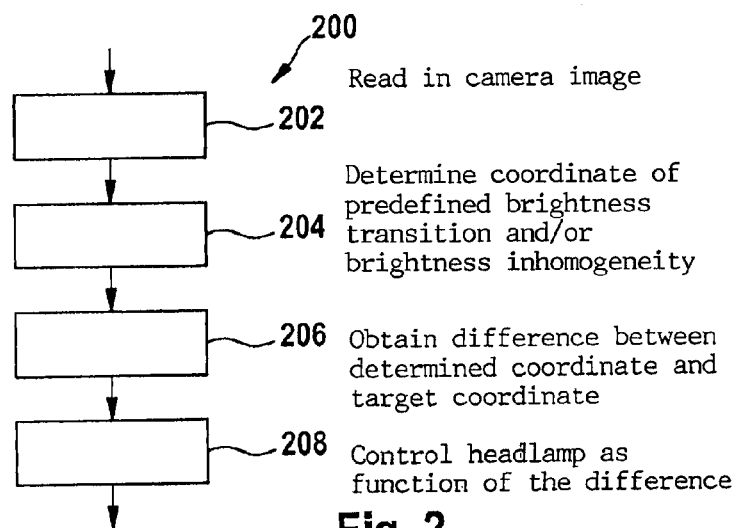
FIG. 2 shows a flow diagram of a method for beam range regulation of at least one headlamp according to an exemplary embodiment of the present invention.

FIG. 2 shows a flow diagram of a method 200 for beam range regulation according to an exemplary embodiment of the invention. The method includes the steps 202, 204, 206, and 208 as indicated.

Figure 3A:
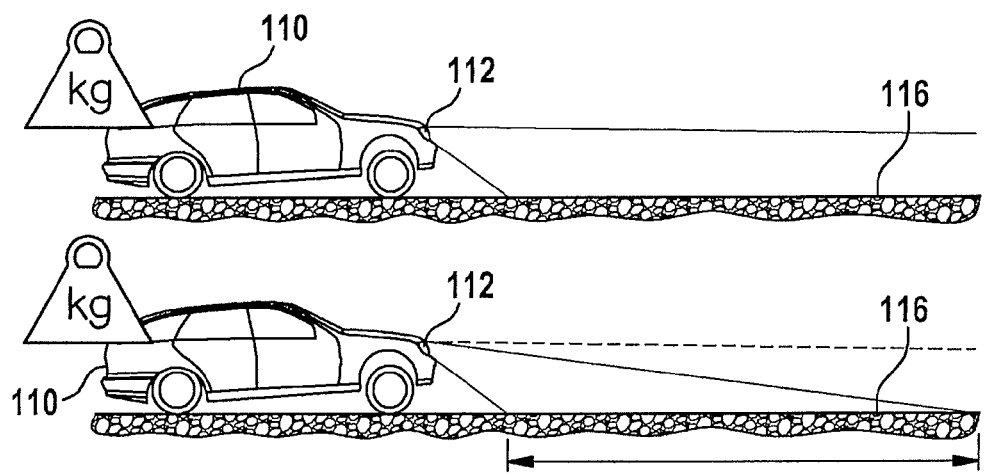
FIGS. 3a through 3c show representations of various exemplary embodiments of beam range regulation systems.
Figure 3B:
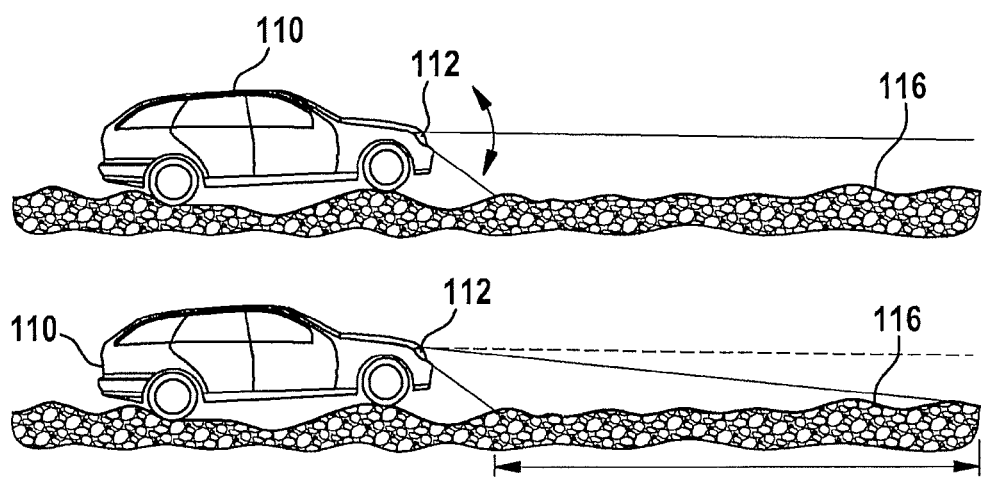
Figure 3C:
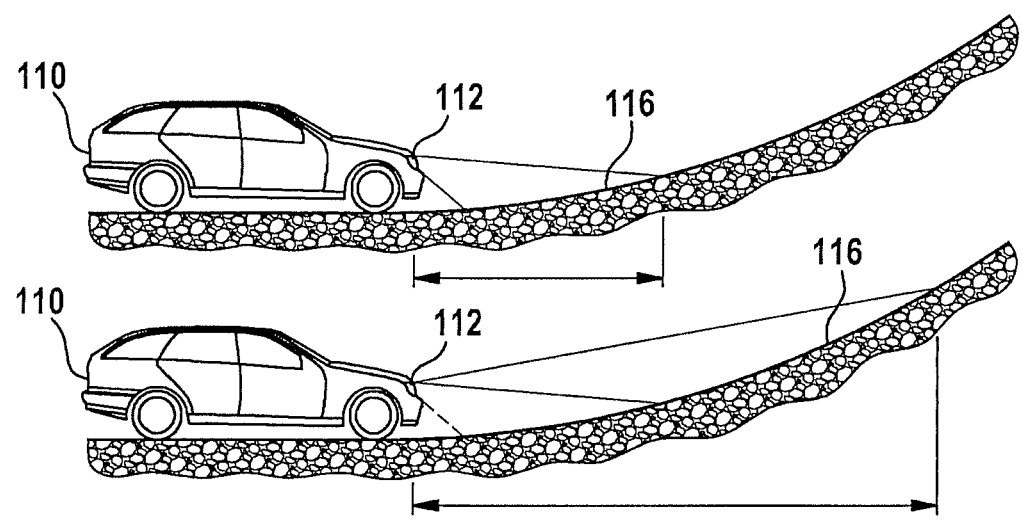

FIGS. 3a, 3b, and 3c show a representation of two vehicles 110 each having at least one headlamp 112, situated one over the other in each case. In each case, an upper vehicle 110 does not have a beam range regulation. In each case, a lower vehicle 110 is equipped with a beam range regulation. Headlamps 112 of vehicles 110 each emit a light cone onto a respective projection surface 116 in front of the vehicle. In the respective lower vehicle 110, the beam range regulation regulates a beam range of headlamp 112 to a maximum value for the beam range that is in accordance with regulations, which in this exemplary embodiment is 65 m.

In FIG. 3a, lower vehicle 110 has a static beam range regulation. Both vehicles 110 are heavily loaded in the area of a rear axle of vehicle 110. Loading is represented by a weight symbol. Due to the loading, vehicles 110 are oriented, or tilted, oblique to a contact surface of vehicles 110. A front end of vehicles 110 is further from the contact surface than is a rear end of vehicles 110. Headlamps 112 are situated at the front end, and the loading is situated at the rear end. In upper vehicle 110, headlamp 112 has a beam range that is greater than the prescribed maximum value, because the vehicle has an oblique orientation. In lower vehicle 110, headlamp 112 is rotated in the direction toward the contact surface by the static beam range regulation, so that projection surface 116 extends only up to the maximum value in accordance with regulations.

In FIG. 3b, lower vehicle 110 has a dynamic beam range regulation. Both vehicles 110 are traveling over an uneven contact surface. Therefore, the beam range of headlamps 112 changes corresponding to a resulting pitching movement of vehicles 110. In the upper vehicle, a modification of the beam range is indicated by a two-headed arrow in the light cone. The dynamic beam range regulation in lower vehicle 110 stabilizes the headlamp, so that the maximum value according to regulations for the beam range is maintained despite the pitching movement of vehicle 110.

In FIG. 3c, lower vehicle 110 has an expanded beam range regulation. Both vehicles 110 are standing on a flat contact surface. A surface having an upward incline is situated in front of both vehicles. In the case of upper vehicle 110, not having expanded beam range regulation, projection surface 116 is shortened due to the upward incline in front of vehicle 110. The beam range is therefore smaller than the maximum value in accordance with regulations. In the case of lower vehicle 110, having beam range regulation, the upward incline is recognized and the headlamp cone of headlamp 112 is pivoted upward from a plane of the contact surface until the beam range on the upward incline reaches the maximum value in accordance with regulations. Projection surface 116 is then situated above vehicle 110 on the surface having the upward incline.

Figure 4A:
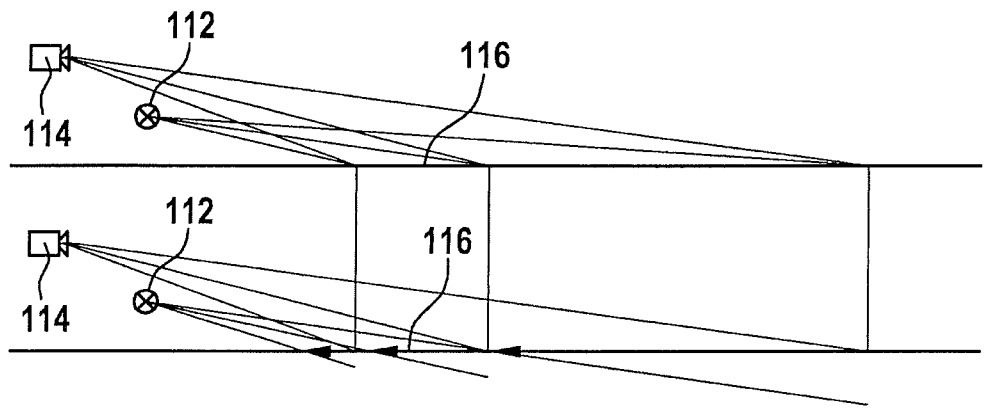
FIGS. 4a and 4b show representations of cases of application of a method for beam range regulation of at least one headlamp according to an exemplary embodiment of the present invention.
Figure 4B:
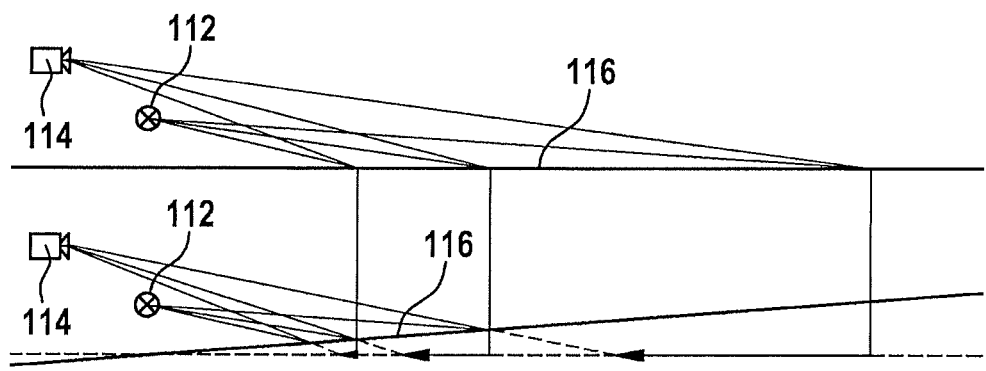

FIGS. 4a and 4b show a schematic representation of a recognition of a shortened beam range in a camera image according to an exemplary embodiment of the present invention. A vehicle (not shown) has at least one headlamp 112 and a camera 114. Headlamp 112 illuminates a surface in front of the vehicle with a headlamp beam. The headlamp beam is represented on the surface as projection surface 116. Due to an oblique angle of incidence of the light beam on projection surface 116, projection surface 116 has a brightness distribution such that more light impinges on the surface close to the vehicle than at a distance further from the vehicle. The headlamp beam is limited by two depicted edge beams. Representing the brightness distribution, in the headlamp beam a single light ray is emphasized that represents a brightness transition between a brightly illuminated region and a less brightly illuminated region in projection surface 116. Both in FIG. 4a and in FIG. 4b, for comparison in each case a normal state (upper representation) and a different state (lower representation) are shown one over the other. End points of the light beams of headlamp 112 on projection surface 116 in the normal state are carried over by broken lines into the representation of the other state in order to achieve a comparability of the two representations situated one over the other. Camera 114 receives light from an acquisition region of camera 114, and generates a camera image therefrom. Projection surface 116 is also situated in the acquisition region. Representing a received image of camera 114, in the normal state the endpoints of the edge beams and of the light beam are connected to the camera by lines of sight.

At the bottom in FIG. 4a, another state is shown in which headlamp 112 is tilted downward toward the surface in front of the vehicle and is decalibrated. Due to this, the headlamp beam strikes the contact surface of the vehicle closer in front of the vehicle, and projection surface 116 is smaller than in the normal state shown thereabove. A light-dark boundary and inhomogeneities in the headlamp beam are situated closer to the vehicle when headlamp 112 is decalibrated or is pointed downward. In the illustration, arrows between the impinge points of the edge beams and of the light beam in the normal state and between the impinge points of the edge beams and of the light beam in the shifted state represent the shift. Camera 114 acquires the reduced and shifted projection surface 116 as well as the brightness distribution or, alternatively or in addition, the brightness transition. In a light control device (not shown), in a method for beam range regulation of headlamp 112, according to an exemplary embodiment of the present invention the camera image is read in from camera 114 in a step of reading in. In a step of determination, from the camera image a coordinate of the brightness transition or, alternatively or in addition, a coordinate of the brightness distribution is determined. In a step of comparison, the coordinate is compared to a target coordinate, or the brightness distribution is compared to a target brightness distribution. A deviation, or difference, is obtained from the comparison. In a step of controlling, headlamp 112 is controlled as a function of the difference, using a beam range modification signal, in particular until the deviation between the coordinate and the target coordinate, and/or the deviation between the brightness distribution and the target brightness distribution, is smaller than a tolerance value.

At the bottom in FIG. 4b, a further state is shown in which headlamp 112 is set as in the normal state (at the top in FIG. 4b). However, here the surface in front of the vehicle has an upward incline. This is intended for example to represent a crest. Because the surface inclining upward intersects the headlamp beam earlier than in the normal state, the light beams from headlamp 112 are shortened. As a result, projection surface 116 is smaller and closer to the vehicle than in the normal state. The upward-inclined surface also intersects the sight lines to the camera earlier than in the normal state. As a result, in the camera image projection surface 116 appears to be displaced less far from the vehicle than is actually the case. Camera 114 continues to assume a flat contact surface on the crest. Due to a shift of the projection surface, it is assumed that headlamp 112 is pointing too far downward. As in FIG. 4a at the bottom, the beam range of headlamp 112 can be modified by a method for beam range regulation according to an exemplary embodiment of the present invention. Because the surface having the upward incline also shortens the sight lines, the actually achieved beam range is set somewhat smaller than in the normal case. If, however, the crest in front of the vehicle is recognized as a surface having an upward incline (for example through an evaluation of the height contour of the roadway), then the resulting shortening of the guidelines can be compensated, and the beam range of headlamp 112 can be set to the value as in the normal case.

In other words, FIGS. 4a and 4b show a beam range regulation via a camera 114 having a known brightness curve. The range of view at night is related to the brightness of headlamps 112. Therefore, ever-brighter headlamp systems are constantly being developed that already almost exceed the boundary values set by legal regulations. This has become possible with the introduction of new light sources in headlamp 112: xenon headlamps (headlamps having a high-pressure gas discharge light source) generally have a higher light flux then do halogen headlamps (headlamps having a light bulb as light source), and are thus significantly brighter. If headlamps 112 exceed a certain light flux (brightness), they must be equipped with an automatic beam range regulation system and a headlamp washing apparatus. Blinding can occur due to light scattered by dirty headlamps 112. The additional systems significantly increase the system costs, so that fewer headlamps 112 having a high light flux are installed in vehicles of the mid-class or lower class. The light quality and/or light strength has an immediate effect on range of view and thus on the risk of accidents.

Many vehicles that are not equipped with an automatic beam range regulation take part in traffic with wrongly adjusted headlamps. This results in a shorter range of view for the driver, or blinding of other traffic participants. It would therefore be advantageous if an automatic beam range regulation were to be provided in the future for all headlamp types. Low-cost solutions for all vehicles are therefore important.

Beam range regulation exists in various embodiments, as shown in FIGS. 3a through 3c. There exists a simple load compensation that, when a loading of the vehicle is present, sets headlamps 112 in such a way that the range remains constant. If a dynamic beam range regulation is present, then as a function of the current pitching movement of vehicle 110 an attempt is made to set headlamps 112 to a constant beam range. In an expanded beam range regulation ALC (Adaptive Low Beam Control), headlamps 112 are set in such a way that they carry out a topographical compensation in anticipatory fashion, e.g. they raise the light cone before a crest.

For a static beam range regulation, as in FIG. 3a, for load compensation at least one elevation sensor is required on an axle. For a dynamic or expanded beam range regulation, as in FIGS. 3b and 3c, at least two sensors are required. With a camera system 114, as used with high beam assistants, lane tracking assistants, and traffic sign recognition, the height contour can be recognized ahead of time. In this way, an expanded beam range regulation can be realized. A dynamic beam range regulation can also be realized via a pitch rate sensor. The pitch rate can also be estimated from the image.

The axial sensors or elevation sensor system, also used for the load compensation, increase the system costs. Through the use of an already-installed camera 114 and of a known headlamp illumination, the system costs can be reduced, and the portion of manual beam range regulation systems, which are frequently wrongly adjusted, can be reduced.

In FIG. 4a and FIG. 4b, camera 114 records an image in front of vehicle 110, the image being illuminated by headlamp 112. Camera control device 100 recognizes the optimal, or correct, headlamp light distribution on the basis of a light-dark boundary and known inhomogeneities within the light distribution, for example from calibration measurements or, for example, simulation results in the design of the headlamp. The "target light distribution" is present in the memory of the camera system before the beam range regulation, as a priori knowledge. In addition, using a learning method, an adaptation can advantageously be used after a change of lighting element, for example an adaptation to an altered brightness. When, especially in the case of halogen lamps, a lighting element is exchanged, the light bulb may then be situated at a slightly different position, which can result in a slightly modified image of the headlamp cone on the roadway. If the learning method carries out only very slow and sluggish adaptations, over time an exchange of the bulb can be recognized and the internal representation can be adapted.

Due to the offset of camera 114 and headlamp 112, camera control device 100 can determine deviations in the beam range. Inhomogeneities and the light-dark boundary are then not situated at the original points.

For an initialization, camera control device 100 can specify to headlamp 112 that during the measurement the headlamp is to lower the light beam and thus the light distribution by a relative angle of radiation in order to obtain a different illumination of the scene, or a sharper projection 116 of the light-dark boundary on the roadway. In this way, topographical differences and/or differences in the degree of reflection of the roadway, caused for example by a color of the ground, can be better calculated out.

The measurement of the headlamp light distribution can for example be carried out at the beginning of the trip, if, given a large number of headlamp systems 112, a calibration run of the step motors takes place. Through a measurement or estimation of the degree of reflection, the surveying of the headlamp light distribution, from which the calibration is estimated, can be improved.

The estimation of the decalibration of headlamps 112 is made more difficult by a topography that is not flat. The light-dark boundary and headlamp inhomogeneities are then projected at a different location than expected.

Using the results of a surface estimation, if warranted after traveling a headlamp measurement stretch, for example 65m, the expected light distribution can be calculated and headlamps 112 can be adapted.

The beam range regulation for load compensation or static beam range regulation can be supplemented by a dynamic beam range regulation and/or expanded beam range regulation if the angle of radiation relative to the surface is determined continuously during travel.

When there is an exchange of the lighting element, above all changes in the brightness of the illumination are to be expected. Advantageous here is a method that learns slowly, in which the stored a priori knowledge, or stored light distribution, is adapted slowly, so that the performance of the method is further increased.

Likewise, imprecise a priori knowledge can be improved by a learning method. This is advantageous for example if simulation data are used as target quantities, or a calibration of the target quantities is carried out one time for each model (not for each vehicle), in which the vehicle-specific deviations cannot be taken into account.

The exemplary embodiments described and shown in the Figures have been selected only as examples. Different exemplary embodiments can be combined with one another in their entirety or with regard to individual features. An exemplary embodiment may also be supplemented with features of another exemplary embodiment.

In addition, method steps according to the present invention may be repeated, and may be executed in a sequence differing from that described.

If an exemplary embodiment includes an "and/or" linkage between a first feature and a second feature, this can be read as meaning that the exemplary embodiment according to one specific embodiment has both the first feature and the second feature, and according to a further specific embodiment has either only the first feature or only the second feature

What is claimed is:

1. A method for beam range regulation of at least one headlamp of a vehicle, comprising:
   reading in a camera image of at least one camera of the vehicle, wherein the camera image includes at least a part of a representation of a projection surface of a light cone of the headlamp in front of the vehicle;
   determining at least one coordinate of at least one of (i) predefined brightness transition in the camera image, and (ii) a predefined brightness inhomogeneity in the camera image, and additionally determining an unevenness contour of the surface of a roadway by determining a height contour of the roadway surface over a predefined distance by traveling the roadway with the vehicle over the predefined distance;
   comparing the determined coordinate to a target coordinate to obtain a difference between the determined coordinate and the target coordinate, wherein the target coordinate represents a coordinate at which the at least one of the predefined brightness transition and the predefined brightness inhomogeneity is expected, and wherein the target coordinate is adapted corresponding to the unevenness contour of the roadway surface for a repeated pitching motion of the vehicle caused by the unevenness contour of the roadway surface; and
   controlling the headlamp with a beam range modification signal to modify the beam range, wherein the beam range modification signal is a function of the difference between the determined coordinate and the target coordinate.

2. The method as recited in claim 1, further comprising:
   initializing the headlamp before the step of reading in the camera image, wherein the initializing includes controlling the headlamp with an initialization signal in order to modify the size of the projection surface.

3. The method as recited in claim 2, wherein:
   the determining step additionally includes determining at least a part of an outline of the projection surface; and
   the comparing step additionally includes comparing the outline of the projection surface to a target outline in order to obtain a difference.

4. The method as recited in claim 3, wherein:
   in the comparing step, the target coordinate is read out from a memory, the target coordinate having been determined in a preceding step of calibration and stored in the memory.

5. The method as recited in claim 1, further comprising:
   determining a reflectivity of a roadway in front of the vehicle from the camera image information, wherein the determined reflectivity is used in the determining of the at least one coordinate.

6. The method as recited in claim 1, wherein:
   the unevenness contour of the roadway surface is determined by one of (i) determining a height contour of a roadway by traveling the roadway with the vehicle, or (ii) a pitch sensor.

7. The method as recited in claim 1, further comprising:
modifying the target coordinate by adapting the target coordinate to a variable parameter using a learning algorithm.

8. A light control device for beam range regulation of at least one headlamp of a vehicle, comprising:
  a device for reading in a camera image of at least one camera of the vehicle, wherein the camera image includes at least a part of a representation of a projection surface of a light cone of the headlamp in front of the vehicle;
  a device for determining at least one coordinate of at least one of (i) predefined brightness transition in the camera image, and (ii) a predefined brightness inhomogeneity in the camera image, and for additionally determining an unevenness contour of the surface of a roadway by determining a height contour of the roadway surface over a predefined distance by traveling the roadway with the vehicle over the predefined distance;
  a device for comparing the determined coordinate to a target coordinate to obtain a difference between the determined coordinate and the target coordinate, wherein the target coordinate represents a coordinate at which the at least one of the predefined brightness transition and the predefined brightness inhomogeneity is expected, and wherein the target coordinate is adapted corresponding to the unevenness contour of the roadway surface for a repeated pitching motion of the vehicle caused by the unevenness contour of the roadway surface; and
  a device for controlling the headlamp with a beam range modification signal to modify the beam range, wherein the beam range modification signal is a function of the difference between the determined coordinate and the target coordinate.

9. A non-transitory computer-readable data storage medium storing a computer program having program codes which, when executed on a computer, performs a method for beam range regulation of at least one headlamp of a vehicle, the method comprising:
  reading in a camera image of at least one camera of the vehicle, wherein the camera image includes at least a part of a representation of a projection surface of a light cone of the headlamp in front of the vehicle;
  determining at least one coordinate of at least one of (i) predefined brightness transition in the camera image, and (ii) a predefined brightness inhomogeneity in the camera image, and additionally determining an unevenness contour of the surface of a roadway by determining a height contour of the roadway surface over a predefined distance by traveling the roadway with the vehicle over the predefined distance;
  comparing the determined coordinate to a target coordinate to obtain a difference between the determined coordinate and the target coordinate, wherein the target coordinate represents a coordinate at which the at least one of the predefined brightness transition and the predefined brightness inhomogeneity is expected, and wherein the target coordinate is adapted corresponding to the unevenness contour of the roadway surface for a repeated pitching motion of the vehicle caused by the unevenness contour of the roadway surface; and
  controlling the headlamp with a beam range modification signal to modify the beam range, wherein the beam range modification signal is a function of the difference between the determined coordinate and the target coordinate.

* * * * *